United States Patent [19]

Moore et al.

[11] Patent Number: 5,576,038
[45] Date of Patent: Nov. 19, 1996

[54] LIQUID PACKAGING FILM

[75] Inventors: Neal E. Moore, Cincinnati; James P. Markey, Milford, both of Ohio; Jimmy M. Givens, Orange, Tex.

[73] Assignee: James River Paper Company, Inc., Milford, Ohio

[21] Appl. No.: 402,425

[22] Filed: Mar. 10, 1995

[51] Int. Cl.$^6$ ...................................................... B65D 85/80
[52] U.S. Cl. ........................... 426/127; 426/130; 426/413; 428/35.2; 428/35.7; 428/515; 525/223; 525/227; 525/221; 525/240
[58] Field of Search ...................... 426/115, 127, 426/130, 410, 413, 415; 428/34.8, 35.2, 35.7, 220, 213, 516, 520, 522, 523, 515; 525/223, 227, 240, 221

[56] References Cited

U.S. PATENT DOCUMENTS

| | | | |
|---|---|---|---|
| 3,410,928 | 11/1968 | Baum | 525/221 X |
| 3,600,468 | 8/1971 | Böhme | 525/221 |
| 3,682,767 | 8/1972 | Britton | 161/227 |
| 4,303,710 | 12/1981 | Bullard et al. | 428/35.2 |
| 4,503,102 | 3/1985 | Mollison | 428/35 |
| 4,521,437 | 6/1985 | Storms | 426/130 |
| 4,678,836 | 7/1987 | McKinney et al. | 525/221 |
| 4,837,084 | 6/1989 | Warren | 428/349 |
| 5,288,531 | 2/1994 | Falla et al. | 428/35.2 |

*Primary Examiner*—Esther Kepplinger
*Assistant Examiner*—Milton I. Cano
*Attorney, Agent, or Firm*—Stanley M. Teigland

[57] ABSTRACT

A coextruded film suitable for packaging a flowable material, particularly milk, in a form, fill and seal machine comprises a core layer of a blend of high density polyethylene and linear low density polyethylene and skin layers of a blend of linear low density polyethylene and ethylene-methyl acrylate copolymer.

7 Claims, No Drawings

LIQUID PACKAGING FILM

This invention is a coextruded film that is especially suitable for packaging a flowable material, particularly milk, in a form, fill and seal machine that produces an impulse seal. In such a machine, film is unwound from a roll and formed into a tube wherein the edges of the film are joined in a longitudinal seal. A transverse seal is then formed by an impulse wire which, in one stroke, seals the top of a pouch filled with the flowable material, seals the bottom of the next pouch, and cuts the tube cleanly to separate the pouches. The transverse seal, which is a bead typically having a diameter of about 5 to 15 mils, must prevent the flowable material from leaking. Hence, a critical property of the film used to form the pouch is the ability to form a strong, liquid-tight, impulse seal at the speed at which the machine is designed to run. This invention provides such a film.

The film of this invention comprises three layers: a core layer and two skin layers. The core layer comprises a blend of high density polyethylene (HDPE) and linear low density polyethylene (LLDPE). Each skin layer comprises a blend of LLDPE and a copolymer of ethylene and methyl acrylate (EMA). The composition of each skin layer is preferably the same as the other skin layer so a single extruder can be used to form both skin layers, but the compositions may be different if desired.

The proportion of HDPE in the core layer is preferably from about 10 to 40 percent by weight. The proportion of the LLDPE in the core layer is correspondingly from about 60 to 90%.

HDPE is a homopolymer of ethylene having a density from about 0.940 to 0.970 g/cc. The melt index of the HDPE is preferably from about 0.1 to about 8.0 dg/min., more preferably from about 0.2 to about 2.0 dg/min.

LLDPE is a linear copolymer of ethylene with a minor amount of an alpha-olefin having from three to ten carbon atoms. The alpha-olefin is preferably hexene or octene. The density of LLDPE is from about 0.916 to about 0.935. g/cc LLDPE is therefore different from polymers known in the art as ultra low or very low density polyethylene, which typically have a density below about 0.916. g/cc The LLDPE preferably has a melt index between about 0.1 and 8.0, dgg/min. more preferably between about 1 and 4. dg/min. The LLDPE employed in the core layer is preferably the same as the LLDPE employed in the skin layers, but the LLDPEs may be different if desired.

The proportion of LLDPE in each skin layer is preferably from about 40 to 80 percent by weight. The proportion of EMA is correspondingly from about 20 to 60 percent. The EMA preferably contains from about 10 to 30 percent by weight of the methyl acrylate comonomer, and may be a random or block copolymer. The melt index of the EMA is preferably between about 0.1 and about 10, more preferably between about 1.0 and 4.0. dg/min.

The core layer preferably comprises from about 60 to 90 percent of the thickness of the film. Each skin layer comprises from about 5 to 20 percent of the thickness of the film. The thickness of the film is preferably from about one to ten mils, more preferably from two to four mils.

The core layer preferably has a higher melting point than the skin layers, which is believed to aid in the formation of a strong impulse seal by stabilizing the melt. The core layer may also become entwined with the skin layers in the bead.

The pouch formed by the film of this invention not only has a strong seal, it also has other desirable properties, including good impact strength, puncture resistance, burst strength, and stiffness for machining.

The film may be made by either the cast or blown process.

The film, particularly the skin layers, preferably contain conventional slip and antiblock agents to improve the processability of the film. For running on a form, fill and seal machine, the film preferably has a coefficient of friction to itself between about 0.1 and 0.3. Slip and antiblock agents are available commercially as concentrates in a matrix of low density polyethylene.

The following example illustrates the invention and represents the best mode contemplated for practicing the invention. All parts are by weight.

EXAMPLE

A film having three layers was made by cast coextrusion. The core layer was a blend of 68.5 percent LLDPE (DOW XU-61502.99), 30.0 percent HDPE (CHEVRON 9650), and 1.5 percent slip masterbatch (5 percent erucamide in low density polyethylene). The LLDPE contained octene as the alpha-olefin comonomer, had a density of 0.917, g/cc and a melt index of 2.3. dg/min. The HDPE had a density of 0.950 g/cc and a melt index of 0.3 dg/min. The skin layers consisted of a blend of 62.5 percent LLDPE (same as employed in the core layer), 29.0 percent EMA (CHEVRON SP2205), 2.5 percent slip masterbatch (same as employed in the core layer), and 6.0 percent antiblock masterbatch (10 percent silica in low density polyethylene). The EMA contained 20 percent methyl acrylate, had a density of 0.942, g/cc and a melt index of 2.0. dg/min. The film had a thickness of 3.0 mils, with the core layer comprising 64 percent of the thickness and each skin layer comprising 18 percent. The film also had the following properties:

| | |
|---|---|
| Haze: | 16 percent |
| Gloss: | 50 percent |
| Coefficient of Friction: | 0.15 |
| Dart Drop Impact (F-50): | 300 grams |
| Heat Seal Strength: (240° F., 20 psi, 2 seconds) | 5.7 pounds per inch |
| Tensile Strength: | 4600 psi |
| Tensile Elongation: | 1100% |
| Secant Modulus: | 25,000 psi |
| Hot Tack Strength: (110° C., 40 psi, 1 second) | 2.93 Newtons/inch |

The film was used to package milk on a Thimonnier M3200 machine with excellent results. Less than 0.2 percent of the pouches leaked. One hundred pouches were subjected to a drop test of five feet. All survived without bursting. Close inspection of the transverse seals revealed that they were smooth, well formed and geometrically consistent. In comparison, pouches made from a monolayer film comprising mostly LLDPE had more variation in the size and shape of the seal beads. Poorly formed or shaped seal beads are responsible for pouches leaking.

We claim:

1. A coextruded film comprising:

a) a core layer comprising a blend of from about 10% to 40 percent by weight of high density polyethylene and from about 60 to 90 percent of a linear copolymer of ethylene with a minor amount of an alpha-olefin having from three to ten carbon atoms, the linear copolymer having a density from about 0.916 to about 0.935 g/cc, the core layer comprising from about 60 to 90 percent of the thickness of the film, and b) skin layers comprising a blend of from about 20 to 60 percent by weight of a copolymer of ethylene with 15 to 25 percent by weight of methyl acrylate, and from about 40 to 80 percent of a linear copolymer of ethylene with a minor amount of an alpha-olefin having from three to ten carbon atoms, the linear copolymer having a density from about 0.916 to about 0.935, g/cc each skin layer comprising from about 5 to 20 percent of the thickness of the film.

2. The film of claim 1 wherein the thickness of the film is from about one mil to about ten mils.

3. The film of claim 1 wherein the melt index of each polymer is from about 0.1 to about 10 dg/cc.

4. The film of claim 1 wherein the core layer has a higher melting point than the skin layers.

5. A pouch containing a flowable material, said pouch being made from the film of claim 1.

6. The pouch of claim 5 wherein the pouch is formed by an impulse seal.

7. The pouch of claim 6 wherein the flowable material is milk.

* * * * *